US011398090B2

(12) United States Patent
Rogness et al.

(10) Patent No.: US 11,398,090 B2
(45) Date of Patent: *Jul. 26, 2022

(54) METHODS AND APPARATUS TO GENERATE AN AUGMENTED ENVIRONMENT INCLUDING A WEIGHT INDICATOR FOR A VEHICLE

(71) Applicant: Ford Global Technologies, LLC, Dearborn, MI (US)

(72) Inventors: Anton Rogness, Dearborn, MI (US); Peter Simeon Lazarevski, Dearborn, MI (US); Joshua Rajasingh, Ypsilanti, MI (US); Andrew Niedert, Farmington Hills, MI (US); Elliott Pearson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,602

(22) Filed: Apr. 21, 2021

(65) Prior Publication Data

US 2021/0256262 A1 Aug. 19, 2021

Related U.S. Application Data

(63) Continuation of application No. 16/191,134, filed on Nov. 14, 2018, now Pat. No. 10,990,822.

(Continued)

(51) Int. Cl.
*G06K 9/00* (2022.01)
*G06K 9/62* (2022.01)
(Continued)

(52) U.S. Cl.
CPC ............ *G06V 20/20* (2022.01); *G01G 19/12* (2013.01); *G01G 23/32* (2013.01); *G06K 9/6288* (2013.01);

(Continued)

(58) Field of Classification Search
None
See application file for complete search history.

(56) References Cited

U.S. PATENT DOCUMENTS 6,490,515 B1 12/2002 Okamura et al.
8,364,439 B2 1/2013 Mintz et al.
(Continued)

FOREIGN PATENT DOCUMENTS

DE 102014001031 7/2015
DE 102014216076 2/2016
EP 1512575 3/2005

OTHER PUBLICATIONS

United States Patent and Trademark Office, "Non-Final Office Action," dated Dec. 11, 2019 in connection with U.S. Appl. No. 16/191,134, 8 pages.

(Continued)

*Primary Examiner* — Mohammad J Rahman
(74) *Attorney, Agent, or Firm* — Ray Coppiellie; Hanley, Flight & Zimmerman, LLC

(57) ABSTRACT

Methods, apparatus, systems, and articles of manufacture are disclosed to generate an augmented environment including a weight indicator for a vehicle. An example disclosed apparatus includes a sensor interface to receive load data associated with a vehicle, and receive live video data from a camera, the live video data including a location of an object in the vehicle, a load mapper to generate a map of loads on the vehicle based on the load data, an object-to-weight correlator to correlate a load of the map of loads with the object, and an augmented reality generator to generate an augmented environment identifying the location of the object and the load correlated with the object.

20 Claims, 6 Drawing Sheets

Related U.S. Application Data

(60) Provisional application No. 62/497,317, filed on Oct. 15, 2018.

(51) Int. Cl.

| | | |
|---|---|---|
| *G06T 19/00* | (2011.01) | |
| *G01G 19/12* | (2006.01) | |
| *G01G 23/32* | (2006.01) | |
| *G06V 20/20* | (2022.01) | |
| *B60W 40/13* | (2012.01) | |
| *B60R 1/00* | (2022.01) | |

(52) U.S. Cl.
CPC .............. *G06T 19/006* (2013.01); *B60R 1/00* (2013.01); *B60W 40/13* (2013.01)

(56) References Cited

U.S. PATENT DOCUMENTS

| | | | |
|---|---|---|---|
| 8,760,515 B2 | 6/2014 | Abe et al. | |
| 10,053,088 B1 | 8/2018 | Askeland | |
| 10,303,961 B1 | 5/2019 | Stoffel et al. | |
| 2012/0010851 A1 | 1/2012 | Mintz et al. | |
| 2012/0191272 A1* | 7/2012 | Andersen ................... | B66F 9/24 701/2 |
| 2013/0116859 A1* | 5/2013 | Ihlenburg .............. | B60W 10/18 701/2 |
| 2015/0019165 A1 | 1/2015 | Theuss et al. | |
| 2015/0054950 A1* | 2/2015 | Van Wiemeersch ......................... | G06T 7/0008 348/148 |
| 2016/0221591 A1 | 8/2016 | Kuehbandner et al. | |
| 2016/0305814 A1* | 10/2016 | Pita-Gil ................. | G01G 19/02 |
| 2016/0325727 A1* | 11/2016 | Ogawa ................... | B60W 20/12 |
| 2017/0267159 A1 | 9/2017 | Bruhn | |
| 2017/0293809 A1 | 10/2017 | Thompson et al. | |
| 2018/0060884 A1 | 3/2018 | Jones et al. | |
| 2018/0068266 A1* | 3/2018 | Kirmani ............... | G01G 19/005 |
| 2018/0096289 A1 | 4/2018 | Terwilliger et al. | |
| 2018/0179732 A1 | 6/2018 | Bartsch et al. | |
| 2018/0197139 A1 | 7/2018 | Hill | |
| 2018/0211219 A1 | 7/2018 | Scott | |
| 2018/0244187 A1 | 8/2018 | Strano et al. | |
| 2019/0043004 A1 | 2/2019 | Lesieur et al. | |
| 2019/0086917 A1 | 3/2019 | Okimoto et al. | |
| 2019/0124619 A1 | 4/2019 | Arumugam et al. | |
| 2019/0232971 A1* | 8/2019 | Vijayakumar ...... | B60W 50/045 |
| 2019/0302794 A1 | 10/2019 | Kean et al. | |
| 2020/0117899 A1 | 4/2020 | Rogness et al. | |
| 2020/0132487 A1* | 4/2020 | Colby ................ | G01C 21/3461 |

OTHER PUBLICATIONS

United States Patent and Trademark Office, "Final Office Action," dated May 28, 2020 in connection with U.S. Appl. No. 16/191,134, 9 pages.

United States Patent and Trademark Office, "Notice of Allowance," dated Dec. 30, 2020 in connection with U.S. Appl. No. 16/191,134, 7 pages.

\* cited by examiner

METHODS AND APPARATUS TO GENERATE AN AUGMENTED ENVIRONMENT INCLUDING A WEIGHT INDICATOR FOR A VEHICLE

RELATED APPLICATION

This patent arises from a continuation of U.S. patent application Ser. No. 16/191,134, filed on Nov. 14, 2018 and entitled "METHODS AND APPARATUS TO GENERATE AN AUGMENTED ENVIRONMENT INCLUDING A WEIGHT INDICATOR FOR A VEHICLE," which claims the benefit of U.S. Provisional Patent Application Ser. No. 62/497,317, which was filed on Oct. 15, 2018. U.S. patent application Ser. No. 16/191,134 and U.S. Provisional Patent Application Ser. No. 62/497,317 are incorporated herein in their entirety.

FIELD OF THE DISCLOSURE

This disclosure relates generally to vehicle loads and, more particularly, to methods and apparatus to generate an augmented environment including a weight indicator for a vehicle.

BACKGROUND

All vehicles have a maximum limit on a load the front and rear axles can withstand. In some examples, each axle has a gross axle weight rating (GAWR) that corresponds to the maximum load that may be supported by the axle. Additionally, weight can be poorly distributed on/in the vehicle. If an axle of the vehicle is overloaded or the vehicle is unbalanced, handling degradation, brake problems, and poor headlight aim can occur. In some examples, a vehicle may be misloaded if a particular axle or suspension assembly is bearing a disproportionate amount of the total load on the vehicle. Loading issues can often be relieved by redistributing objects (e.g., cargo, passengers, etc.) to different sections of the vehicle.

Mobile devices (e.g., smart phones, headsets, etc.) can now support augmented reality (AR) technology that allows virtual information to augment live video data captured by the mobile device. Augmented reality technology can add and/or remove information from the video data as the video data is presented to user (e.g., by the display of the mobile device). In some examples, AR technology can allow information to be intuitively presented to a user by overlaying relevant virtual information onto video of a physical environment in real-time.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
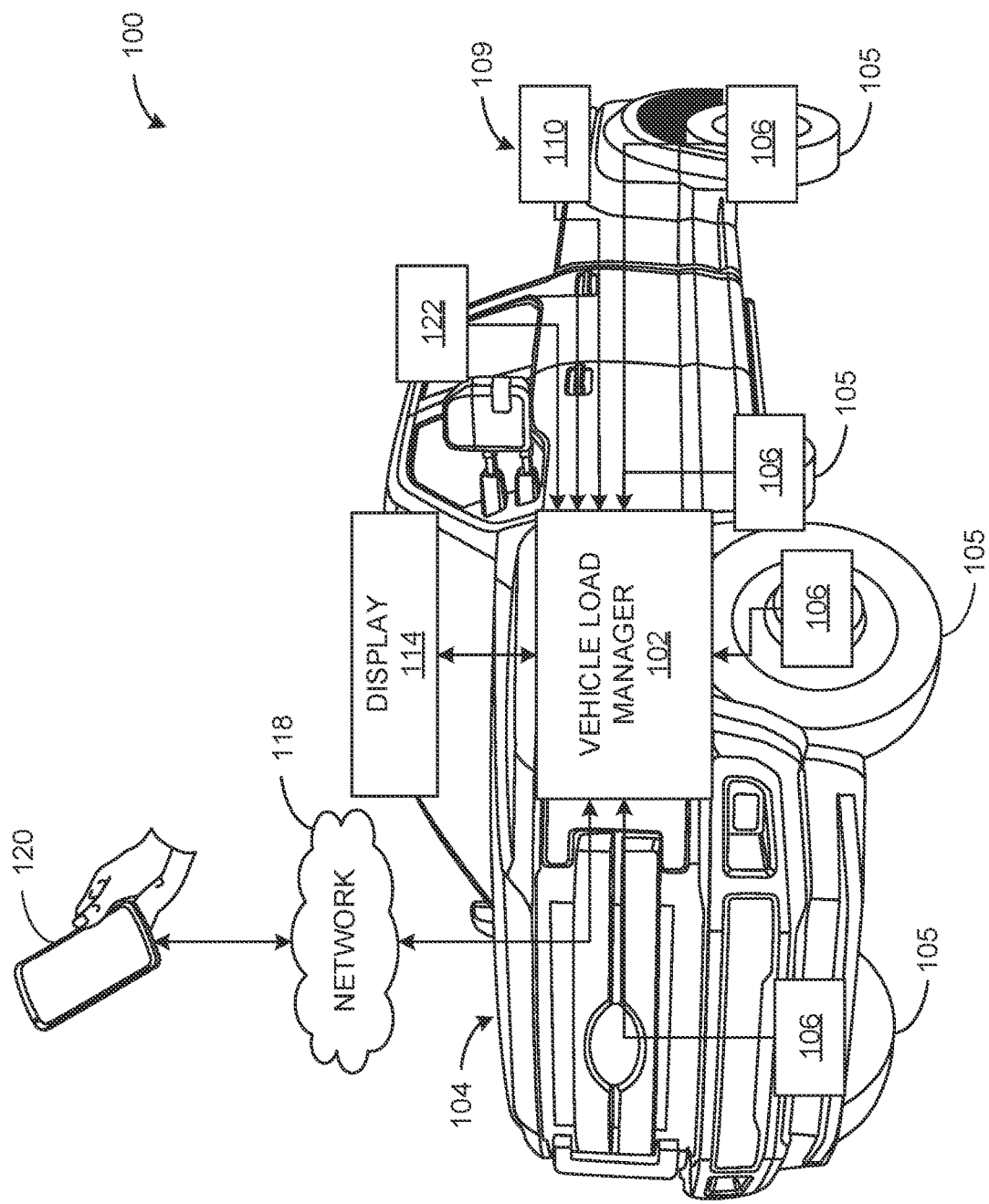
FIG. 1 illustrates an environment of an example vehicle load manager that can be used with an example vehicle with which the examples disclosed herein can be implemented.

Misloading a vehicle can degrade the reliability of the vehicle. As used herein, the phrase "misloading a vehicle" and all variations thereof, refers to distributing objects on/in a vehicle in such a manner that adversely affects the performance of the vehicle, and can, for example, include exceeding the GAWR of one or both axles, exceeding a weight rating of a suspension assembly, unbalancing a weight distribution associated with the vehicle, etc. In some examples, redistributing the load (passengers, cargo, etc.) on a vehicle can alleviate some or all problems caused by misloading a vehicle. In other examples, removing a load from the vehicle can be required. Traditional means of displaying this information to a user (e.g., a warning light of the dashboard, etc.) may not be intuitive or provide sufficient information for a user to quickly and effectively understand and then correct a loading issue. This lack of intuitiveness or information may lead to a misloaded vehicle.

Methods and apparatus disclosed herein combine load data collected by vehicle sensors and live video data to generate an augmented reality environment including the loading condition of a vehicle and weights borne by components of the vehicle. As used herein, the phrase "augmented reality environment" (also referred to herein as an "augmented environment") is a virtual environment that includes a representation of a physical space (e.g., captured by a video camera) on which computer generated perceptual information is overlaid (e.g., virtual objects are added, physical objects are hidden, etc.). In some examples disclosed herein, objects on/in the vehicle are identified and correlated to load data detected by vehicle sensor(s). In some examples disclosed herein, a map of object shapes, positions, and loads is generated. In some examples disclosed herein, guidance in the form of visual instructions are displayed in the augmented reality environment to indicate how objects can be positioned to properly load the vehicle.

In some examples disclosed herein, a mobile device (e.g., a smartphone, a headset, etc.) with a camera can be used to scan a vehicle to determine what objects are on/in the vehicle. In this example, the mobile device can detect a visual anchor on the vehicle to determine the position of identified objects relative to the visual anchor. As used herein, a visual anchor is a visually identifiable feature at a fixed location on a vehicle that can be used to reference the locations of objects in/on the vehicle. In other examples disclosed herein, a camera integral with the vehicle (e.g., a camera mounted above a bed of a truck) can be used to identify an object loaded in a specific area of the vehicle (e.g., a truck bed). In some examples, machine vision techniques can be used to identify objects. In some examples disclosed herein, the augmented reality environment can be displayed on a display integral with the vehicle. In other examples disclosed herein, the augmented reality environment can be presented on a display of the mobile device.

FIG. 1 illustrates an environment 100 of an example vehicle load manager 102 that can be used with an example vehicle 104 with which the examples disclosed herein can be implemented. The vehicle 104 includes one or more example wheel and suspension assemblies 105, one or more example weight sensor(s) 106, an example trailer hitch 109, an example trailer weight sensor 110, and an example camera 122. In some examples, the vehicle load manager 102 can output information to an example display 114 and/or output information to an example mobile device 120 via an example network 118. In the illustrated example, the vehicle 104 is a consumer automobile. In other examples, the vehicle 104 can be a commercial truck, a motorcycle, a motorized cart, an all-terrain vehicle, a bus, a motorized scooter, a locomotive, or any other vehicle.

The example vehicle load manager 102 enables the generation of an augmented reality environment to guide a user to properly load the vehicle 104. For example, the vehicle load manager 102 can receive information from sensors (e.g., the weight sensor(s) 106, the trailer weight sensor 110, etc.), process the data, and output an augmented reality environment (e.g., to the display 114 or the mobile device 120). In some examples, the vehicle load manager 102 can additionally receive live video data from a camera of the mobile device 120 and/or the example camera 122. In some examples, the vehicle load manager 102 can further generate guidance to be presented to the user to instruct the user how to redistribute the load on the vehicle 104. The example camera 122 can be, for example, mounted in a center high mounted stop light (CHMSL) of the vehicle (e.g., the brake light indicator above the rear window of a truck bed, etc.).

In some examples, one or more of the wheel and suspension assemblies 105 can be coupled via an axle (e.g., a front axle, a rear axle, etc.). Additionally, one or more of the wheel and suspension assemblies 105 can include a weight sensor 106 (e.g., an axle load sensor). In some examples, the weight sensors 106 are ride height sensors that measure the compression of specific ones of the wheel and suspension assemblies 105 (e.g., a deflection of an elastic element of the wheel and suspension assembly 105), from which load information can be derived. In other examples, the weight sensors 106 can be transducers capable of converting load information into an electrical signal to be received by the vehicle load manager 102.

In the illustrated example, the vehicle 104 can tow a trailer coupled to the vehicle 104 via the trailer hitch 109. A trailer may exert a load on the vehicle 104, which can be measured by the example trailer weight sensor 110. In some examples, the trailer weight sensor 110 can be integrated into the trailer hitch 109. In some examples, the trailer weight sensor 110 is a force sensor (e.g., a magnetoelastic sensor, a load cell, a strain gauge, an accelerometer, etc.) capable of measuring forces and/or moments at the trailer hitch 109. In some examples, the trailer weight sensor 110 measures the load corresponding to the one or more loads exerted on the vehicle 104 by a towed trailer (e.g., total load of the trailer, tongue, etc.).

In some examples, the display 114 can present a user of the vehicle 104 with an augmented reality environment produced by the vehicle load manager 102. In these examples, the display 114 can display an augmented reality environment including one or more instructions, load conditions of the vehicle 104, and/or weight indications (e.g., how much load is applied to an axle or the wheel and suspension assembly 105).

In some examples, the vehicle load manager 102 is connected to the network 118. For example, the network 118 can be a WiFi network or a BlueTooth® network. In other examples, the network 118 can be implemented by any suitable wired and/or wireless network(s) including, for example, one or more data buses, one or more Local Area Networks (LANs), one or more wireless LANs, one or more cellular networks, one or more public networks, etc. The example network 118 enables the example vehicle load manager 102 to be in communication with devices external to the vehicle 104 (e.g., the mobile device 120). As used herein, the phrase "in communication," including variances thereof, encompasses direct communication and/or indirect communication through one or more intermediary components and does not require direct physical (e.g., wired) communication and/or constant communication but, rather, includes selective communication at periodic or aperiodic intervals, as well as one-time events.

In the illustrated example of FIG. 1, the example mobile device 120 includes a camera and a user interface (e.g., a display). The example mobile device 120 can be one of or a combination of a smart phone, a tablet, a smart watch, a VR/AR headset, smart glasses, etc. In the illustrated example, the mobile device 120 communicates with the vehicle load manager 102 via the network 118. In other examples, the mobile device 120 can be connected to the vehicle load manager 102 via a wired connection.

Figure 2:
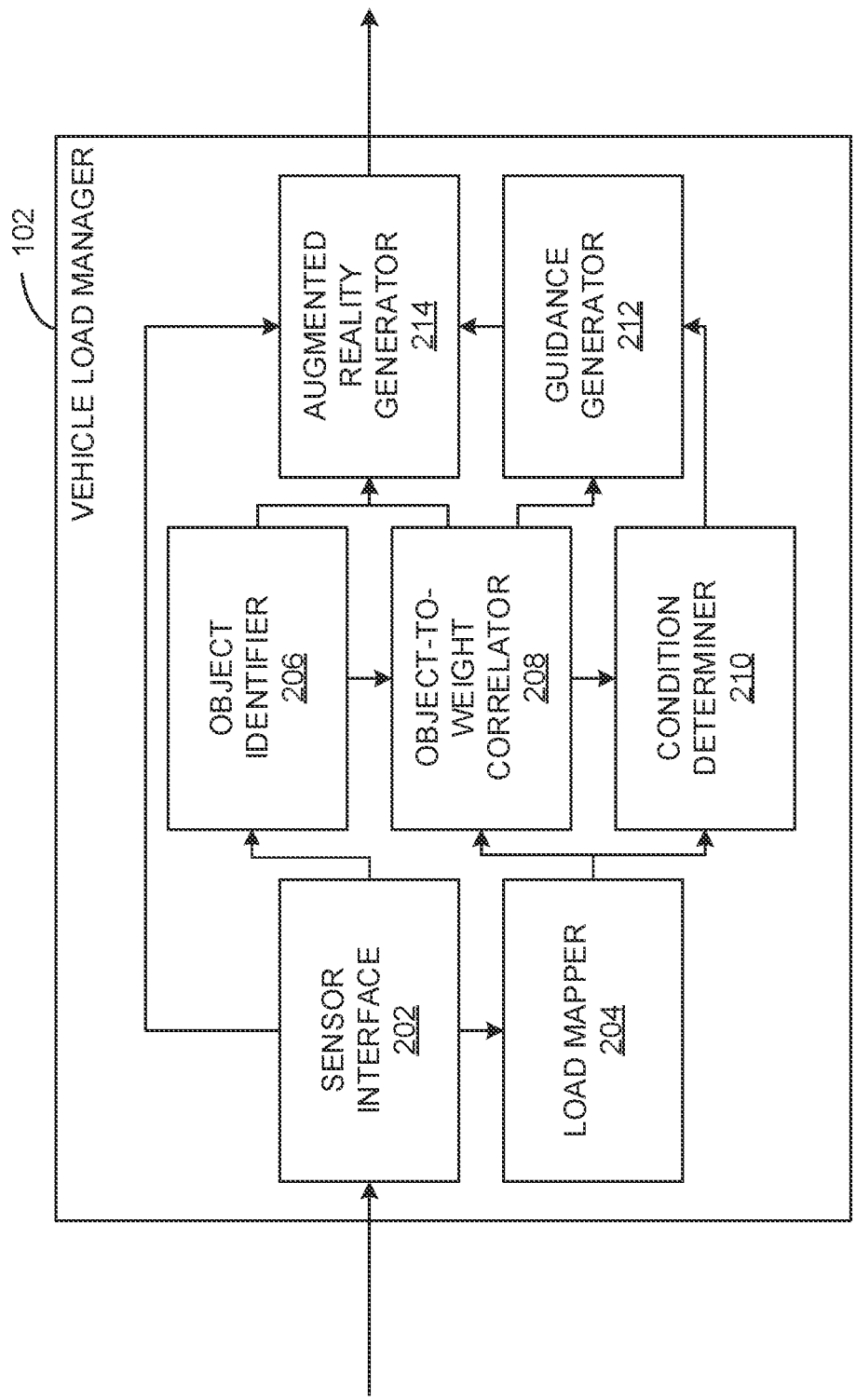
FIG. 2 is a block diagram depicting the vehicle load condition manager of FIG. 1.

FIG. 2 is a block diagram depicting the vehicle load manager 102 of FIG. 1. The example vehicle load manager 102 includes an example sensor interface 202, an example load mapper 204, an example object identifier 206, an example object-to-weight correlator 208, an example condition determiner 210, an example guidance generator 212 and an example augmented reality generator 214. The vehicle load manager 102 can be implemented fully on the vehicle 104, fully on the mobile device 120 or any combination thereof.

The example sensor interface 202 receives sensor data from the sensors of the example vehicle 104. For example, the sensor interface 202 can receive input from one or more of the example weight sensors 106 of FIG. 1, the example trailer weight sensor 110 of FIG. 1, and/or any other sensors (e.g., a fuel level sensor, an engine speed sensor, a vehicle speed sensor, etc.). In some examples, the sensor interface 202 can receive live video data from the mobile device 120. In some examples, the sensor interface 202 distributes received sensor data to at least one of the load mapper 204, the object identifier 206, and/or the augmented reality generator 214. For example, the sensor interface 202 can distribute load data (e.g., data received from the weight sensors 106) to the load mapper 204.

The example load mapper 204 determines a map of the loads on the vehicle 104. For example, the load mapper 204 can analyze the sensor data distributed by the sensor interface 202 to determine the location and weight of objects on/in the vehicle 104. For example, the load mapper 204 can analyze the sensor data to determine that an object weighing 85 pounds is placed on the passenger seat of the vehicle 104. In some examples, the load mapper 204 can generate a visual representation of the vehicle 104 with the additional loads on the vehicle 104.

The example object identifier 206 reviews the data distributed by the sensor interface 202 to determine the location of objects loading the vehicle 104. For example, the object identifier 206 can analyze live video data from the mobile device 120 and/or the camera 122 to visually identify an object on/in the vehicle 104. In some examples, the object identifier 206 can identify a visual anchor to create a reference point on the vehicle 104 to reference the location of the identified objects. In other examples, if the camera 122 is fixed to the vehicle 104, the object identifier 206 can compare the live video data to an image of the vehicle 104 without objects to identify objects in the live video data. In some examples, the object identifier 206 can use machine learning algorithms to identify and locate visual objects. In some examples, the object identifier 206 can use machine vision techniques (e.g., pattern recognition, edge detection, color detection, keypoint mapping, image histogram, etc.).

The example object-to-weight correlator 208 correlates the load map generated by the load mapper 204 to the objects identified by the object identifier 206. For example, the object-to-weight correlator 208 can associate a load in the bed of a vehicle 104 with an object identified by the object identifier 206 in the same location (e.g., tag the identified object with the corresponding load, etc.). In some examples, the object-to-weight correlator 208 can generate a map of shapes, loads, and positions of the object(s) on/in the vehicle 104 based on the load map and identified objects.

The example condition determiner 210 analyzes the load map generated by the load mapper 204 and/or sensor data for the sensor interface 202 to determine the load condition of the vehicle 104. For example, the condition determiner 210 can determine if the load map indicates that the vehicle 104 is overloaded. In other examples, the condition determiner 210 can determine if a GAWR of the vehicle 104 has been exceeded. In other examples, the condition determiner 210 can determine that vehicle 104 is not misloaded. In some examples, the condition determiner 210 can determine whether rearranging the objects on/in the vehicle 104 would alleviate an adverse load condition(s) of the vehicle 104.

The example guidance generator 212 generates instructions to redistribute loads on the vehicle 104 to improve the load condition of the vehicle 104. For example, the guidance generator 212 can determine that an object in the bed of the vehicle 104 should be moved to a different location in the bed to better distribute the load on the vehicle 104. In some examples, the guidance generator 212 can generate an instruction that indicates the location and/or direction the object should be moved to correct the loading condition. In some examples, the guidance generator 212 can generate an instruction to guide the user to remove objects on/in the vehicle 104. In other examples, if the vehicle 104 is properly loaded (e.g., not misloaded), the guidance generator 212 does not generate instructions. In some such examples, the guidance generator 212 can generate an indication that the vehicle 104 is properly loaded. In some examples, the guidance generator 212 can generate instructions even if the vehicle 104 is properly loaded.

The example augmented reality generator 214 generates an augmented reality environment based on the data received by the sensor interface 202, the object-to-weight correlator 208, and the guidance generator 212. The example augmented reality generator 214 generates an augmented reality environment to be presented via the display 114 and/or the mobile device 120. The augmented reality generator 214 can, for example, create a visual indication of the load on each of the wheel and suspension assemblies 105 and/or axles of the vehicle 104. In some examples, the augmented reality generator 214 can generate a warning if the vehicle 104 is misloaded. In some examples, the augmented reality generator 214 can present a guidance instruction based on the input from the guidance generator 212 (e.g., instructions 314 of FIG. 3, the instructions 410 of FIG. 4, etc.). In some examples, the augmented reality generator 214 can update the augmented reality environment in real-time as the objects in the vehicle 104 are moved by a user. In other examples, the augmented reality generator 214 can update the generated augmented reality environment periodically at a predetermined interval or in response to a request from a user.

While an example manner of implementing the vehicle load manager 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example sensor interface 202, the example load mapper 204, the example object identifier 206, the example object-to-weight correlator 208, the example condition determiner 210, the example guidance generator 212, the example augmented reality generator 214, and/or, more generally, the example vehicle load manager 102 of FIG. 3 may be implemented by hardware, software, firmware, and/or any combination of hardware, software, and/or firmware. Thus, for example, any of the example sensor interface 202, the example load mapper 204, the example object identifier 206, the example object-to-weight correlator 208, the example condition determiner 210, the example guidance generator 212, the example augmented reality generator 214, and/or, more generally, the example vehicle load manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, sensor interface 202, the example load mapper 204, the example object identifier 206, the example object-to-weight correlator 208, the example condition determiner 210, the example guidance generator 212, the example augmented reality generator 214 is/are hereby expressly defined to include a non-transitory computer readable storage device or storage disk such as a memory, a digital versatile disk (DVD), a compact disk (CD), a Blu-ray disk, etc., including the software and/or firmware. Further still, the example vehicle load manager 102 of FIG. 1 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
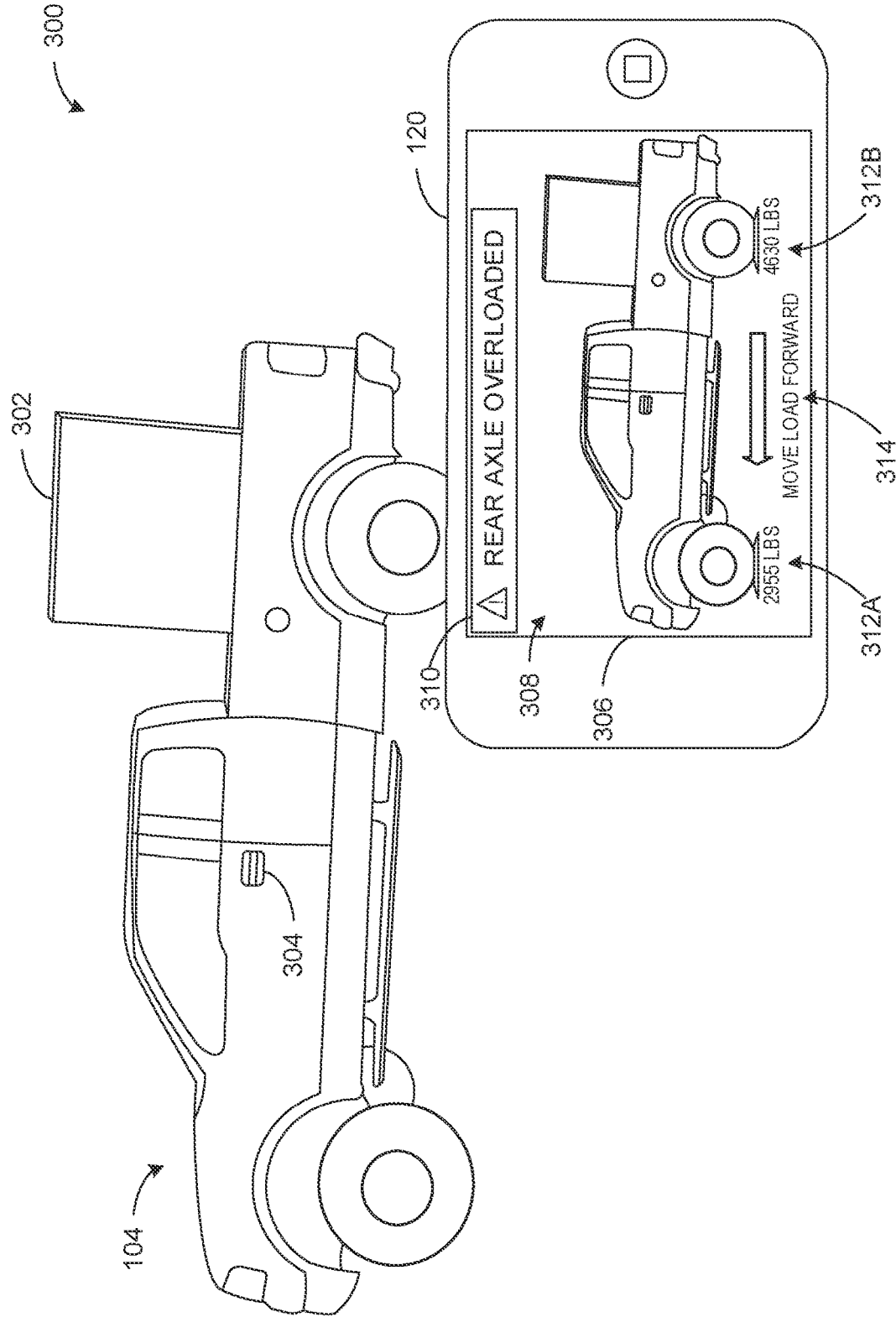
FIG. 3 is an example illustration of a vehicle and an example augmented reality environment generated by the vehicle load manager 102 of FIG. 1.

FIG. 3 is an example illustration 300 of the vehicle 104 including and an example augmented reality environment generated by the vehicle load manager 102. The example illustration 300 includes the example vehicle 104 of FIG. 1, an example object 302, and an example visual anchor 304. The example illustration 300 further includes the example mobile device 120 with an example display 306 displaying an example augmented reality environment 308 generated by the vehicle load manager 102. The example augmented reality environment 308 includes an example warning 310, an example front axle weight indicator 312A, an example rear axle weight indicator 312B and an example instruction 314. While an example of the graphical user interface of the augmented reality environment 308 is illustrated in FIG. 3, any other suitable graphical user interface may be used to represent the augmented reality environment 308 and/or the output of the vehicle load manager 102.

The example vehicle 104 is loaded by the object 302. In the illustrated example, the object 302 is loaded in the bed of the vehicle 104. In other examples, the object 302 may be on/in any other location of the vehicle 104. In the illustrated example, the load associated with the object 302 exceeds the GAWR of the rear axle of the vehicle 104, which causes the vehicle 104 to be misloaded. In some examples, the vehicle load manager 102 detects the location, shape, and load associated with the example object 302. In some examples, a camera associated with the mobile device 120 and/or the camera 122 scans the object 302 such that the vehicle load manager 102 can identify the object 302.

In the illustrated example, a user of the mobile device 120 scans the visual anchor 304 with the mobile device 120 (e.g., captures the visual anchor 304 in the video data generated by the mobile device 120) to allow the physical location(s) of the object 302 to be determined by the vehicle load manager 102. In the illustrated example, the visual anchor 304 is a handle of a front driver door of the vehicle 104. In other examples, the visual anchor 304 may be any other visually identifiable feature of the vehicle 104 (e.g., a hubcap, the fuel door, etc.). In some examples, the visual anchor 304 may be a sticker and/or other visual feature placed on the vehicle 104 by a user. In some examples, if the visual anchor 304 is not detected by the mobile device 120, the augmented reality environment 308 can include an instruction to the user to continue scanning the vehicle 104 until the visual anchor 304 is identified by the vehicle load manager 102. In the illustrated example, the vehicle 104 includes only the visual anchor 304. In other examples, the vehicle 104 can include any number of anchors in addition to the visual anchor 304.

In the illustrated example, the augmented reality environment 308 is generated based on live video data captured by a camera of the mobile device 120 with the output of the vehicle load manager 102. That is, as the live video data is presented via the display of the mobile device 120, the live video data is being augmented by the vehicle load manager 102. In some examples, the augmented reality environment 308 is updated in real time based on the video data captured by the mobile device 120 and changes to the load condition of the vehicle 104 (e.g., caused by a user adjusting the position of the object 302, etc.).

In the illustrated example of FIG. 3, the warning 310 includes the text the "rear axle overloaded," indicating a GAWR of the rear axle has been exceeded. In some examples, the warning 310 can illustrate the output of the condition determiner 210. In other examples, the warning 310 may represent any other potentially adverse loading condition(s) of the vehicle 104 (e.g., the front axle is overload, the load is unbalanced, etc.). In other examples where there is no adverse loading condition on the vehicle 104, the warning 310 may be absent. In this example, the augmented reality environment 308 may further include an indication that the vehicle 104 is properly loaded.

In the illustrated example of FIG. 3, the front axle weight indicator 312A is a rectangle underneath the front axle of the vehicle 104 in the augmented reality environment 308 and indicates the front axle is loaded with 2,955 lbs. Similarly, in the illustrated example, the rear axle weight indicator 312B is a rectangle underneath the rear axle of the vehicle 104 in the augmented reality environment 308 and indicates the rear axle is loaded with 4,630 lbs. In other examples, the front axle weight indicators 312A and the rear axle weight indicator 312B can be placed in any suitable location in the augmented reality environment 308 to indicate the load on the front and/or rear axles. In other examples, the front axle weight indicator 312A and/or the rear axle weight indicator 312B may include an audio notification to the user. In some examples, each wheel and suspension assembly 105 can have individual weight indicators (e.g., an indicator for the forward driver wheel and suspension assembly 105, an indicator for the forward passenger wheel and suspension assembly 105, etc.).

In the illustrated example, the instruction 314 includes the text "move load forward" and an arrow pointing to the front of the vehicle 104. In other examples, the instruction 314 can be in any other suitable location to indicate that the object 302 should be moved forward relative to the vehicle 104. In some examples, the instruction 314 can include a specific distance and direction to move the object 302. In some examples, the instruction 314 does not include text. In some examples, the instruction 314 may include any other visual representation to indicate how the load on the vehicle 104 should be redistributed (e.g., a line, a visual representation of the object 302 in the correct location, etc.). In some examples, the instruction 314 may include a non-visual notification to the user (e.g., an audio notification, a vibration, etc.).

Figure 4:
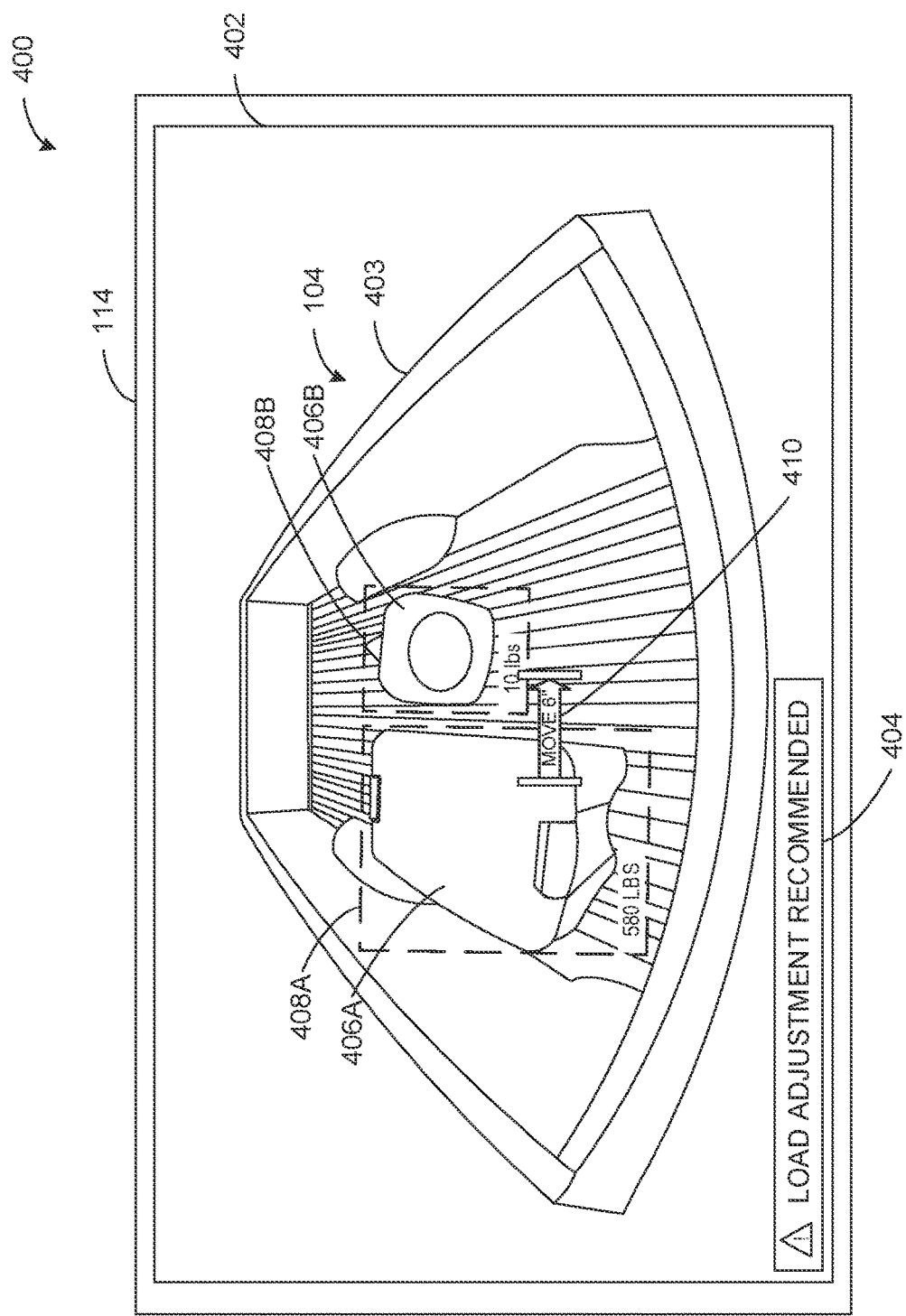
FIG. 4 is another example illustration of a vehicle and an example augmented reality environment generated by the vehicle load manager 102 of FIG. 1.

FIG. 4 is another example illustration 400 of the vehicle 104 and an example augmented reality environment 402 generated by the vehicle load manager 102 of FIG. 1. In the illustrated example, the augmented reality environment 402 is displayed via the display 114 of FIG. 1 and is generated based on the output the vehicle load manager 102 and live video data gathered by the camera 122 of FIG. 1. That is, as the live video data is presented via the display of the display 114, the live video data is being augmented by vehicle load manager 102. The example vehicle 104 further includes an example bed 403 holding an example first object 406A and an example second object 406B. The augmented reality environment 402 includes an example first weight indication 408A, an example second weight indication 408B, an example warning 404, and example instructions 410. In some examples, the augmented reality environment 402 is updated in real time based on the live video data captured by the camera 122 and changes in the load condition of the bed 403 (e.g., caused by a user adjusting the positions of the first object 406A and/or the second object 406B, etc.).

In the illustrated example, the first object 406A is a portable cooler and the second object 406B is a traffic cone. In other examples, the first object 406A and the second object 406B can be any other objects. In some examples, the vehicle load manager 102 of FIG. 1 can determine the load, shape, and position associated with both the first object 406A and the second object 406B. In the illustrated example, the vehicle load manager 102 determines that the vehicle 104 is unbalanced and that the first object 406A should be moved to properly balance the vehicle 104.

In some examples, the warning 404 can display the output of the condition determiner 210 of FIG. 2. In the illustrated example of FIG. 4, the warning 404 includes the text "load adjustment recommended," which indicates the vehicle 104 is unbalanced. In other examples, the warning 404 can indicate any other potentially adverse loading condition(s) of the vehicle 104 (e.g., the front axle is overloaded, etc.). In other examples where there is no adverse loading condition on the vehicle 104, the warning 404 may not be present in the augmented reality environment 402. In this example, the augmented reality environment 402 can further display indication that the vehicle 104 is properly loaded.

In the illustrated example, the instructions 410 is an arrow pointing to the right with respect to the display 114 including the text "move 6" indicating the first object 406A is to be moved 6 inches to the right on the vehicle 104 to properly balance the vehicle 104. In other examples, the instructions 410 can be in any suitable location and can include any suitable text and/or visual representation (e.g., a line, a visual representation of the first object 406A in the correct location, etc.). In some examples, the instructions 410 can include a non-visual notification to the user (e.g., an audio notification, a vibration, etc.). In some examples, the instructions 410 can include multiple steps (e.g., moving both the first object 406A and the second object 406B).

Figure 5:
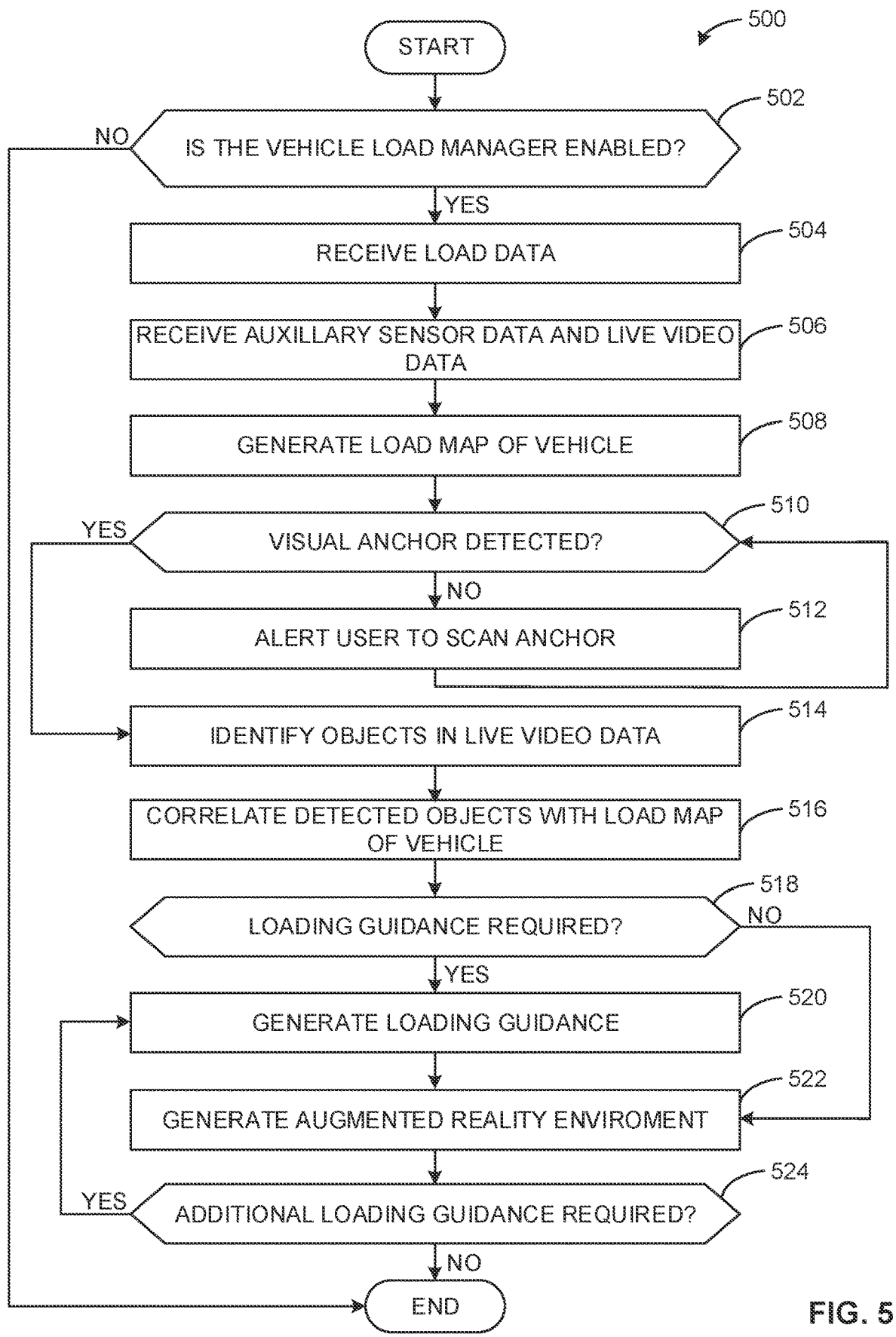
FIG. 5 is a flowchart representative of machine readable instructions that may be executed to implement the vehicle load condition manager of FIG. 1.

A flowchart representative of example methods, hardware implemented state machines, and/or any combination thereof for implementing the vehicle load manager 102 of FIG. 2 is shown in FIG. 5. The method can be implemented using machine readable instructions that may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example vehicle load manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc4.) structured to perform the corresponding operation without executing software or firmware.

As mentioned above, the example method of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The method 500 of FIG. 5 begins at block 502. At block 502, if the vehicle load manager 102 is enabled, the method 500 advances to block 504. If the augmented vehicle load manager 102 is not enabled, the method 500 ends. For example, the vehicle load manager 102 can be enabled by a user. In other examples, the vehicle load manager 102 can automatically become enabled if the vehicle 104 is misloaded.

At block 504, the sensor interface 202 receives load data. For example, the sensor interface 202 can interface with one or more of the weight sensor(s) 106 associated with the wheel and suspension assemblies 105 of the vehicle 104. In some examples, the sensor interface 202 can further receive load data from the trailer weight sensor 110 and/or any other load sensors of the vehicles (e.g., load sensors associated with the seats of the vehicle 104). In some examples, the sensor interface 202 can convert the received load data into a format (e.g., a digital signal, a bit-based value, etc.) processable by the vehicle load manager 102. In some examples, the sensor interface 202 can distribute the received load data to any other elements of the vehicle load manager 102 (e.g., load mapper 204, the object identifier 206, etc.).

At block 506, the sensor interface 202 receives auxiliary sensor data and video data. For example, the sensor interface 202 can receive data from any other sensors on the vehicle 104 necessary to generate a load map of the vehicle (e.g., a fuel level sensor, etc.). In some examples, the sensor interface 202 can convert the received load(s) into a format processable by the vehicle load manager 102. In some examples, the sensor interface 202 can receive live video data generated by the mobile device 120 and/or the camera 122. In some examples, the sensor interface 202 can distribute the received auxiliary data and/or live video data to any other components of the vehicle load manager 102 (e.g., load mapper 204, the object identifier 206, etc.). In some examples, the live video data captures a visual anchor (e.g., the visual anchor 304 of FIG. 3) and/or one or more objects in/on the vehicle 104.

At block 508, the load mapper 204 generates a load map of the vehicle 104. For example, the load mapper 204 can analyze the load data distributed by the sensor interface 202 to generate a map of loads on the vehicle 104. In some examples, the load mapper 204 can generate a visual representation of the loads on the vehicle 104. At block 510, if the object identifier 206 identifies an anchor (e.g., the visual anchor 304 of FIG. 3) on the vehicle 104 captured in the live video data, the method 500 advances to block 514. If an anchor is not identified by the object identifier 206, the method 500 advances to block 512.

At block 512, the object identifier 206 alerts the user to scan an anchor of the vehicle 104. For example, the object identifier 206 can generate an alert to be displayed (e.g., on a display of the mobile device 120, the display 114, etc.). In some examples, the object identifier 206 can augment the live video data to include an indication to scan a visual anchor on the live video data. In some examples, the object identifier 206 can issue a non-visual alert to the user (e.g., vibrating the mobile device, an audible message, etc.). For example, the object identifier 206 may alert the user to reposition the camera generating the live video data to better capture the visual anchor 304.

At block 514, the object identifier 206 identifies objects in the live video data. For example, the object identifier 206 can process the live video data received by the sensor interface 202 to identify objects on/in the vehicle 104. In some examples, the object identifier 206 can identify the locations of identified objects relative to the visual anchor 304.

At block 516, the object-to-weight correlator 208 correlates the detected objects with the load map. For example, the object-to-weight correlator 208 can associated identified objects (e.g., identified by the object identifier 206) with the load map (e.g., generated by the load mapper 204) in a nearby position. In some examples, the object-to-weight correlator 208 generates a visual map of the load, shape, and position of objects on/in the vehicle 104.

At block 518, the condition determiner 210 determines if loading guidance is required. For example, the condition determiner 210 can determine if the vehicle 104 is misloaded. In some examples, condition determiner 210 can determine if the vehicle 104 is not optimally loaded. In some examples, the condition determiner 210 can transmit the determined condition to the augmented reality generator 214. If the condition determiner 210 determines that loading guidance is required, the method 500 advances to block 520. If the condition determiner 210 determines that loading guidance is not needed, the method 500 advances to block 520.

At block 520, the guidance generator 212 generates loading guidance. For example, the guidance generator 212 can determine that the objects in and/or on the vehicle 104 should be rearranged to correctly load the vehicle 104. In some examples, the guidance generator 212 can determine that objects should be removed from the vehicle 104. In some examples, the guidance generator 212 can indicate the location and distance a specific object in/on the vehicle 104 should be moved to alleviate adverse loading conditions. Additionally or alternatively, the guidance generator 212 can generate a visual representation (e.g., an arrow including text) indicating how one or more objects should be rearranged on the vehicle 104.

At block 522, the augmented reality generator 214 generates an augmented reality environment. For example, the augmented reality generator 214 can combine the visual map generated by the object-to-weight correlator 208 with the live video data (e.g., presented on the mobile device 120 and/or the camera 122). In some examples, the augmented reality generator 214 can generate weight indicators to identify the weight of objects on/in the vehicle 104 (e.g., the weight indicators 408A and 408B of FIG. 4). In some examples, the augmented reality generator 214 can generate an indication of a load carried by the front axle or rear axle of the vehicle 104 (e.g., the weight indicators 312A and 312B). In some examples, the augmented reality generator 214 can generate an indication of the load carried by each of the wheel and suspension assemblies 105 of FIG. 1.

At block 524, the condition determiner 210 determines if additional loading guidance is required. For example, the condition determiner 210 can evaluate a new map generated by the object-to-weight correlator 208 to determine if the vehicle 104 is misloaded. In other examples, the condition determiner can process the live video data to determine if a user has followed the guidance generated by the guidance generator 212. If the loading condition has been resolved, the method 500 ends. If additional loading guidance is required, the method 500 returns to block 522 to generate new loading guidance.

Figure 6:
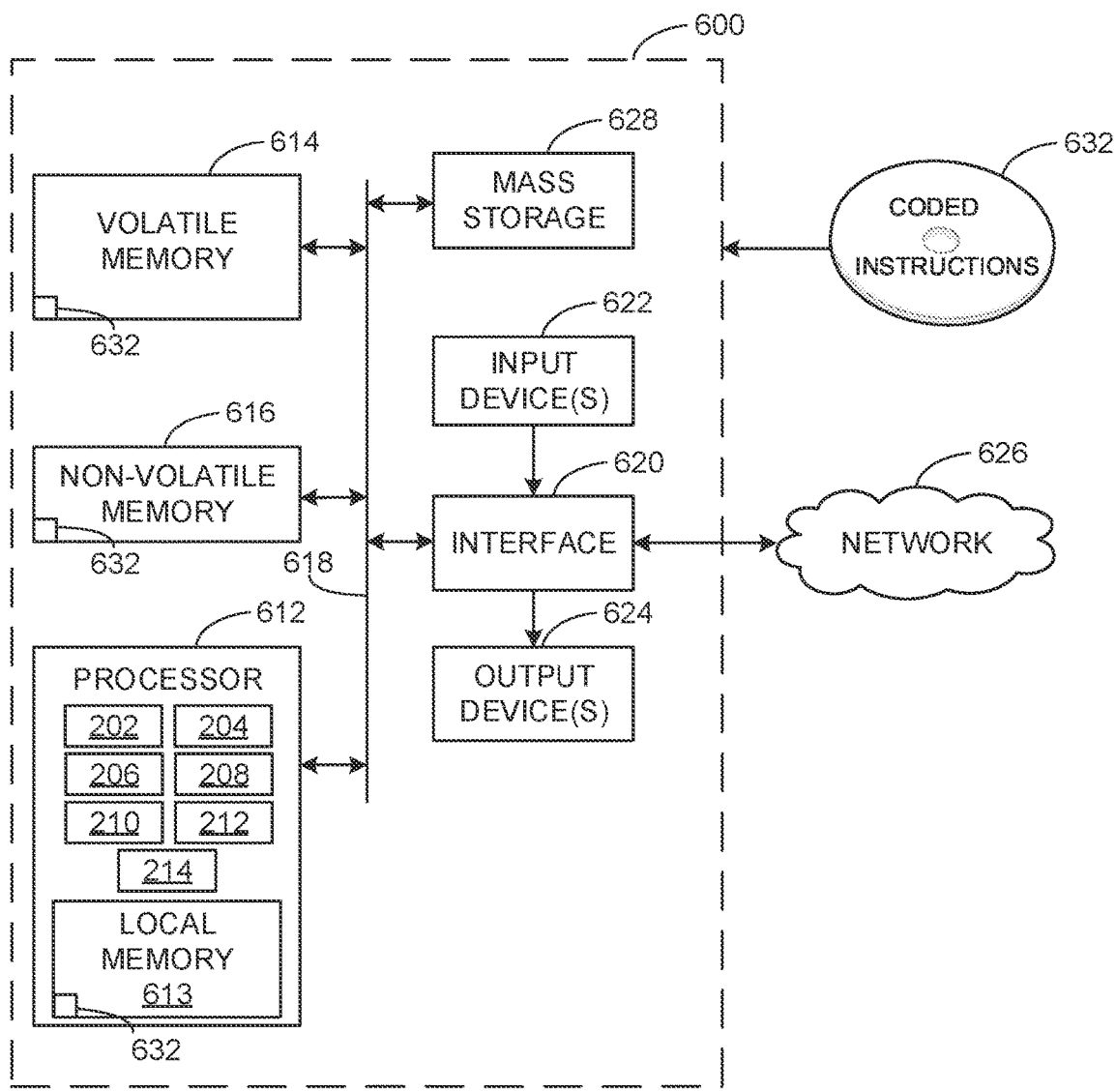
FIG. 6 is a block diagram of an example processing platform structured to execute the instructions of FIG. 5 to implement the vehicle load condition manager of FIG. 1.

FIG. 6 is a block diagram of an example processor platform 600 capable of executing instructions of FIG. 5 to implement the vehicle load manager 102 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example sensor interface 202, the example load mapper 204, the example object identifier 206, the example object-to-weight correlator 208, the example condition determiner 210, the example guidance generator 212 and the example augmented reality generator 214.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 620 of the illustrated example, thus, typically includes a graphics driver card, a graphics driver chip, and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 to implement the methods of FIG. 5 may be stored in the mass storage device 628, in the volatile memory 614, in the non-volatile memory 616, and/or on a removable non-transitory computer readable storage medium such as a CD or DVD.

Example 1 includes an apparatus, comprising a sensor interface to receive load data associated with a vehicle, and receive live video data from a camera, the live video data including a location of an object in the vehicle, a load mapper to generate a map of loads on the vehicle based on the load data, an object-to-weight correlator to correlate a load of the map of loads with the object, and an augmented reality generator to generate an augmented environment identifying the location of the object and the load correlated with the object.

Example 2 includes the apparatus of example 1, wherein the augmented environment is updated in real-time.

Example 3 includes the apparatus of example 2, wherein the augmented environment is presented to a user via a mobile device, the mobile device including the camera.

Example 4 includes the apparatus of example 2, wherein the augmented environment is presented to a user via a display integrated in the vehicle.

Example 5 includes the apparatus of example 1, wherein the object-to-weight correlator is further to process the live video data to identify a visual anchor on the vehicle indicating a known location on the vehicle.

Example 6 includes the apparatus of example 1 further including a condition determiner to determine a load condition of the vehicle based on the load data, and a guidance generator to modify the augmented environment with a visual indication based on the load condition, the visual indication including an instruction to move the object.

Example 7 includes a method, comprising generating a map of loads on a vehicle based on load data associated with a sensor of the vehicle, correlating a load of the map of loads with an object identified using live video data received from a camera, and generating an augmented environment identifying a location of the object and the load correlated with the object.

Example 8 includes the method of example 7, the method further including determining a load condition of the vehicle based on the load data and modifying the augmented environment with a visual indication based on the load condition, the visual indication including an instruction to move the object.

Example 9 includes the method of example 8, wherein the visual indication is continuously updated as the objected is moved.

Example 10 includes the method of example 8, wherein the visual indication is an arrow indicating a direction the object is to be moved.

Example 11 includes the method of example 7 further including presenting the augmented environment to a user via a display.

Example 12 includes the method of example 11, wherein the display and the camera are included in a mobile device.

Example 13 includes the method of example 7 further including identifying a visual anchor indicating a known point on the vehicle.

Example 14 includes a non-transitory computer readable medium comprising instructions, which when executed cause a processor to at least generate a map of loads on a vehicle based on load data associated with a sensor of the vehicle, correlate a load of the map of loads with an object, the object identified from live video data received from a camera, and generate an augmented environment identifying a location of the object and the load correlated with the object.

Example 15 includes the non-transitory computer readable medium of example 14, further including instructions which when executed cause the processor to determine a load condition of the vehicle based on the load data and modify the augmented environment with a visual indication based on the load condition, the visual indication including an instruction to move the object.

Example 16 includes the non-transitory computer readable medium of example 15, wherein the visual indication is continuously updated as the objected is moved.

Example 17 includes the non-transitory computer readable medium of example 15, wherein the visual indication is an arrow indicating a direction the object is to be moved.

Example 18 includes the non-transitory computer readable medium of example 14, further including instructions which when executed cause a processor to present the augmented environment to a user via a display.

Example 19 includes the non-transitory computer readable medium of example 18, wherein the display and the camera are included in a mobile device.

Example 20 includes the non-transitory computer readable medium of example 14, further including instructions which when executed cause the processor to identify a visual anchor indicating a known point on the vehicle.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A mobile computing device, comprising:
   memory;
   computer readable instructions stored in the memory;
   a user interface;
   a camera to capture video data including a location of an object in a vehicle;
   processor circuitry to execute the computer readable instructions to at least:
      transmit the video data to a second interface associated with the vehicle; and
      present, via the user interface, an augmented environment identifying the location of the object and a load correlated with the object, the load correlated with the object based on a map of loads generated from sensor data of the vehicle.

2. The mobile computing device of claim 1, wherein the processor circuitry executes the computer readable instructions to update the augmented environment in real-time.

3. The mobile computing device of claim 1, wherein the mobile computing device includes at least one of a smartphone, a tablet, a smart watch, a headset, or smart glasses.

4. The mobile computing device of claim 1, wherein the processor circuitry executes the computer readable instructions to:
  determine if the video data includes a visual anchor on the vehicle indicating a known location on the vehicle; and
  in response to determining the video data does not include the visual anchor, alert a user of the mobile computing device to scan the visual anchor.

5. The mobile computing device of claim 1, wherein the processor circuitry executes the computer readable instructions to:
  receive, from the second interface, a first visual indication associated with the augmented environment, the first visual indication including an instruction to move the object; and
  modify the augmented environment with the first visual indication.

6. The mobile computing device of claim 5, wherein the processor circuitry executes the computer readable instructions to:
  transmit updated video data to the second interface, the updated video data captured after a user has moved the object in response to the first visual indication; and
  receive, from the second interface, a second visual indication, the second visual indication including at least one of (1) an alert that the vehicle is not adversely loaded, or (2) a second instruction to move the object.

7. The mobile computing device of claim 1, wherein the video data is transmitted to the second interface via a Local Area Network (LAN) connection.

8. A non-transitory computer readable medium comprising instructions, which when executed cause a processor to at least:
  capture, via a camera of a mobile computing device, video data including a location of an object in a vehicle;
  transmit the video data to a second interface associated with the vehicle; and
  present, via a user interface of the mobile computing device, an augmented environment identifying the location of the object and a load correlated with the object, the load correlated with the object based on a map of loads generated from sensor data of the vehicle.

9. The non-transitory computer readable medium of claim 8, wherein the instructions when executed cause a processor to update the augmented environment in real-time.

10. The non-transitory computer readable medium of claim 8, wherein the mobile computing device includes at least one of a smartphone, a tablet, a smart watch, a headset, or smart glasses.

11. The non-transitory computer readable medium of claim 8, wherein the instructions when executed cause a processor to:
  determine if the video data includes a visual anchor on the vehicle indicating a known location on the vehicle; and
  in response to determining the video data does not include the visual anchor, alert a user of the mobile computing device to scan the visual anchor.

12. The non-transitory computer readable medium of claim 8, wherein the instructions, when executed, cause a processor to:
  receive, from the second interface, a first visual indication associated with the augmented environment, the first visual indication including a first instruction to move the object; and
  modify the augmented environment with the first visual indication.

13. The non-transitory computer readable medium of claim 12, wherein the instructions, when executed, cause a processor to:
  transmit updated video data to the second interface, the updated video data captured after a user has moved the object in response to the first visual indication; and
  receive, from the second interface, a second visual indication, the second visual indication including at least one of (1) an alert that the vehicle is not adversely loaded, or (2) a second instruction to move the object.

14. The non-transitory computer readable medium of claim 12, wherein the first visual indication is an arrow indicating a direction the object is to be moved.

15. A method including:
  capturing, via a camera of a mobile computing device, video data including a location of an object in a vehicle;
  transmitting the video data to a second interface associated with the vehicle; and
  presenting, via a user interface of the mobile computing device, an augmented environment identifying the location of the object and a load correlated with the object, the load correlated with the object based on a map of loads generated from sensor data of the vehicle.

16. The method of claim 15, further including updating the augmented environment in real-time.

17. The method of claim 15, wherein the mobile computing device includes at least one of a smartphone, a tablet, a smart watch, a headset, or smart glasses.

18. The method of claim 15, further including:
  determining if the video data includes a visual anchor on the vehicle indicating a known location on the vehicle; and
  in response to determining the video data does not include the visual anchor, alerting a user of the mobile computing device to scan the visual anchor.

19. The method of claim 15, further including:
  receiving, from the second interface, a first visual indication associated with the augmented environment, the first visual indication including an instruction to move the object; and
  modifying the augmented environment with the first visual indication.

20. The method of claim 19, further including:
  transmitting updated video data to the second interface, the updated video data captured after a user has moved the object in response to the first visual indication; and
  receiving, from the second interface, a second visual indication, the second visual indication including at least one of (1) an alert that the vehicle is not adversely loaded, or (2) a second instruction to move the object.

* * * * *